(12) United States Patent
Fahy

(10) Patent No.: US 9,631,665 B2
(45) Date of Patent: Apr. 25, 2017

(54) SCREW-LOCKING INSERT

(71) Applicant: PEM Management, Inc., Wilmington, DE (US)

(72) Inventor: Trevor Fahy, Galway (IE)

( * ) Notice: Subject to any disclaimer, the term of this patent is extended or adjusted under 35 U.S.C. 154(b) by 188 days.

(21) Appl. No.: 14/555,047

(22) Filed: Nov. 26, 2014

(65) Prior Publication Data

US 2015/0176633 A1    Jun. 25, 2015

Related U.S. Application Data

(60) Provisional application No. 61/909,675, filed on Nov. 27, 2013.

(51) Int. Cl.
*F16B 39/34* (2006.01)
*F16B 1/00* (2006.01)

(52) U.S. Cl.
CPC ...... *F16B 39/34* (2013.01); *F16B 2001/0064* (2013.01)

(58) Field of Classification Search
CPC ......... F16B 39/34; F16B 39/268; F16B 39/36
USPC ................. 411/301, 302, 304, 280
See application file for complete search history.

(56) References Cited

U.S. PATENT DOCUMENTS

| | | | | |
|---|---|---|---|---|
| 1,624,764 A | * | 4/1927 | Sale | F16B 39/12 411/294 |
| 2,462,603 A | * | 2/1949 | Boots | F16B 39/34 238/262 |
| 2,544,096 A | * | 3/1951 | Laughlin | B24B 45/00 403/228 |
| 2,725,915 A | * | 12/1955 | Johnson | F16B 39/34 411/302 |
| 2,913,031 A | | 11/1959 | McKay et al. | |
| 3,150,702 A | | 9/1964 | Buckley et al. | |
| 3,173,466 A | | 3/1965 | Starriett et al. | |
| 3,182,702 A | | 5/1965 | Nason et al. | |
| 3,182,703 A | | 5/1965 | Smyth | |
| 4,472,095 A | * | 9/1984 | Molina | F16B 39/28 411/236 |
| 2012/0045293 A1 | * | 2/2012 | Baxter | F16B 39/34 411/511 |
| 2014/0369786 A1 | * | 12/2014 | Hsieh | F16B 39/34 411/247 |

OTHER PUBLICATIONS

PCT International Search Report for application No. PCT/US14/67751, dated Mar. 11, 2015.

* cited by examiner

*Primary Examiner* — Flemming Saether
(74) *Attorney, Agent, or Firm* — Ryder, Lu, Mazzeo & Konieczny LLC; Joseph M. Konieczny, Sr.; Gregory J. Gore

(57) ABSTRACT

A screw-locking element in the form of an H cross-section profile is fitted into a longitudinal slot through a bushing sidewall that captures opposing recesses of the insert. When assembled to the bushing, the locking presents a base on the outside of the bushing and a screw-engaging longitudinal strip on the inside along the threads. The bushing may have more than one locking insert and the inserts are preferably composed on Nylon.

10 Claims, 2 Drawing Sheets

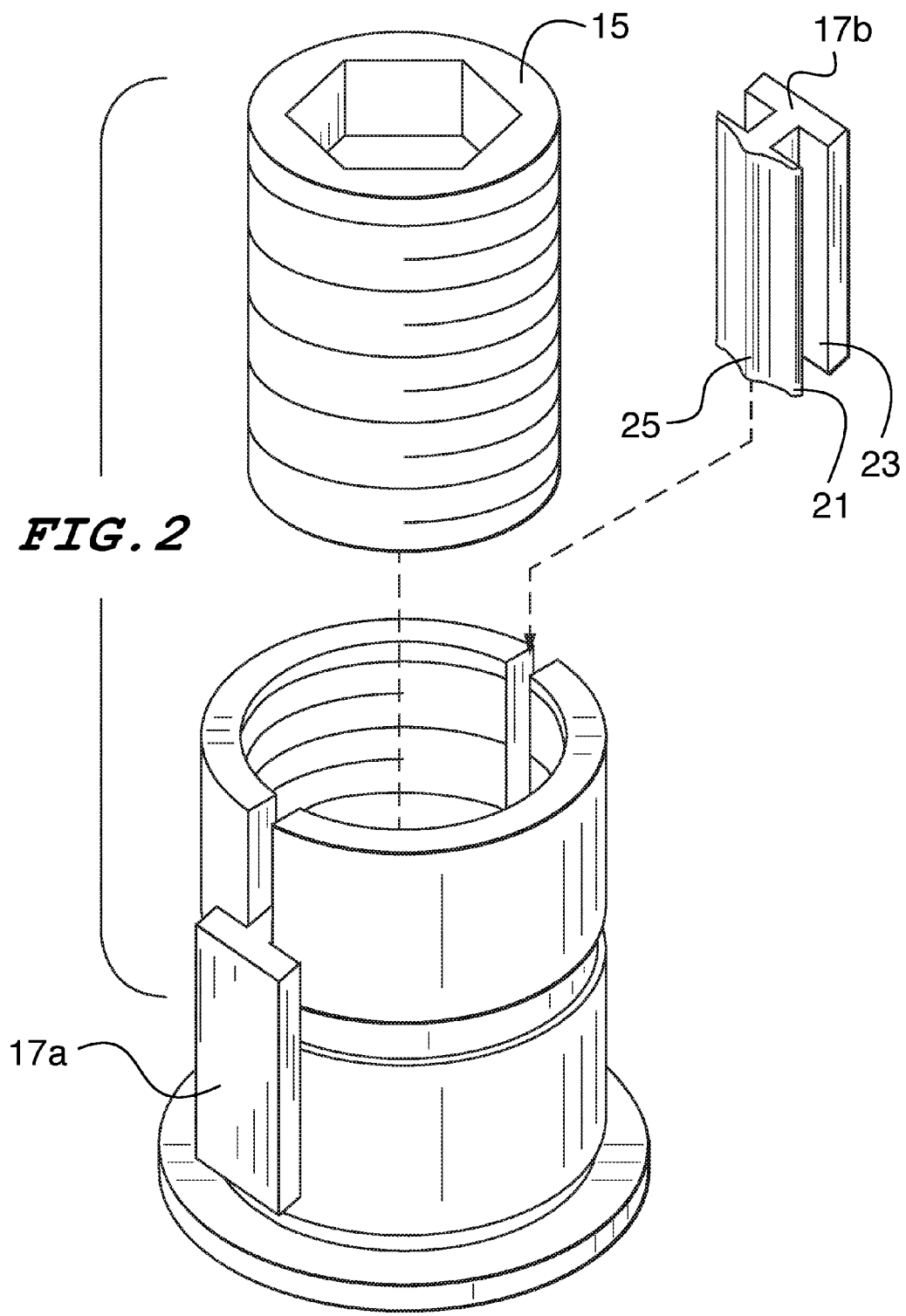

SCREW-LOCKING INSERT

RELATED APPLICATION

This patent application is a non-provisional of U.S. provisional patent application No. 61/909,675 entitled "Screw-Locking Insert" filed on Nov. 27, 2013, from which priority is hereby claimed.

FIELD OF THE INVENTION

This invention relates to threaded female bushings having means for providing a prevailing torque to an inserted screw. More specifically it related to such bushings in which the screw is received sub-flush within the bushing and where electrical contact between the screw and the bushing is required.

BACKGROUND OF THE INVENTION

There are instances within the field of electronics where screw assemblies are used that require reliable electrical contact between the screw and a receiving threaded female bushing. An example is a tuning screw employed as part of the electrical circuitry in a wireless phone substation radio assembly. These screws must be headless and adjusted up and down many times, each time remaining locked in place. Presently this locking function is achieved by a secondary operation such as gluing, or employing either a lock nut or a spring loaded element to apply a prevailing torque to the screw.

These solutions however are problematic for several reasons. Gluing requires a secondary operation which can be messy. The glue requires a curing time which slows production and the results are often inconsistent. In addition, adjustability and service disassembly is restricted.

The use of a lock nut is also less than desirable because like gluing it requires a secondary operation. A lock nut cannot be used for sub-flush screws and tightening the screw down against the lock nut can inadvertently change the desired position of the screw which must be precisely located.

The use of a traditional nylon locking nut has severe limitations in the electronic tuning screw environment. In a traditional locking bushing a nylon locking washer is located at the top of the nut or bushing to apply a prevailing torque to the screw through frictional engagement with the screw. During engagement the nylon material elastically and plastically deforms into the thread form of the screw. This is unacceptable for electronic tuning screws as there must be metal-to-metal contact between the screw and the bushing to eliminate undesirable electrical capacitive effects. In addition, the applied prevailing torque must be available throughout the full travel of the screw in the bushing.

Another solution that has been tried is the use of axially sprung screws that use thread tension to provide a frictional locking effect however these parts are very difficult to manufacture, are expensive and the number of possible re-use cycles is limited. There is therefore a need in the art for an electronic tuning screw assembly which solves these problems.

SUMMARY OF THE INVENTION

The present invention has been devised to meet the need in the art for a better tuning screw assembly which provides prevailing torque locking on screws that run sub-flush and also require electrical contact between the screw and the bushing. In one embodiment of the invention a device is provided that employs a longitudinal locking element fitted to the sidewall of a bushing that receives the screw. In this embodiment the locking element is in the form of an insert extruded of nylon having an H cross-section profile. The locking insert is fitted into a longitudinal slot through the bushing sidewall which captures opposing recesses in the H profile of the insert. When assembled to the bushing, the locking element presents a base on the outside of the bushing and a screw-engaging longitudinal nylon strip on the inside. When fully assembled with the screw, a vertical strip of nylon lays against the bushing threads providing a prevailing torque against the threads of the screw. A bushing may have more than one locking element and preferably two.

This inventive solution provides the desired performance requirements: it allows metal-to-metal contact between the male and female threads for a large portion of the internal bushing diameter; it provides consistent thread prevailing torque at any height within the bushing; and it provides a locking function that any standard thread screw can use and be changed in service.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an exploded isometric view of the assembly of FIG. 1; and,

DETAILED DESCRIPTION OF THE INVENTION

Figure 1:
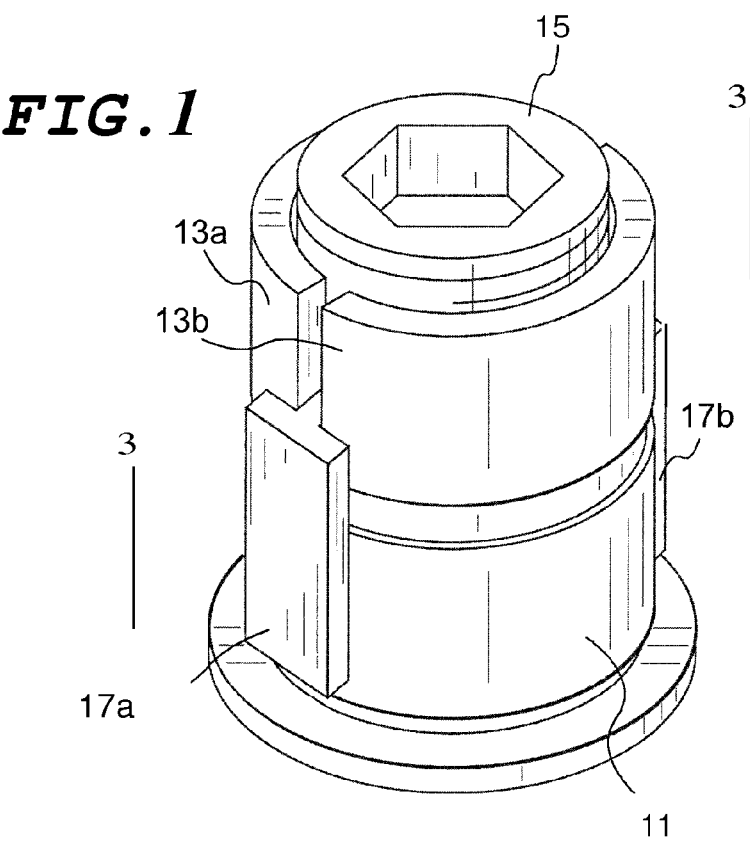
FIG. 1 is a top front isometric view of the invention as assembled.

Referring to FIG. 1, the invention is shown in its assembled condition. Screw 15 is threaded into internally threaded cylindrical bushing 11 which has two opposing slots cut into the bushing sidewall. This forms opposing sidewall halves 13a and 13b. Prior to applying the screw to the bushing the two inserts 17a and 17b have been fitted into their respective sidewall slots.

Referring now to FIG. 2, greater detail of the elements of the invention is shown prior to assembly. Both the screw and threaded bushing are conventional except that two slots in the sidewall divide it into opposing semi-cylindrical halves. Each insert 17a and 17b has side recesses that capture the edges of the sidewall slots inside and out. Inserts 17a and 17b are thus longitudinally insertable into the sidewall slots with an engagement portion 21 positioned internally within the bushing and a second base portion 23 lying against the outer sidewall. The inserts are retained in the slots by force fit, an applied adhesive or any other suitable means of manufacture. The engagement portion may have surfaces which are tapered to a central protuberant longitudinal spine 25 of the insert. The insert is preferably composed of nylon and consists of a segment cut from an extruded strip of greater length.

Figure 3:
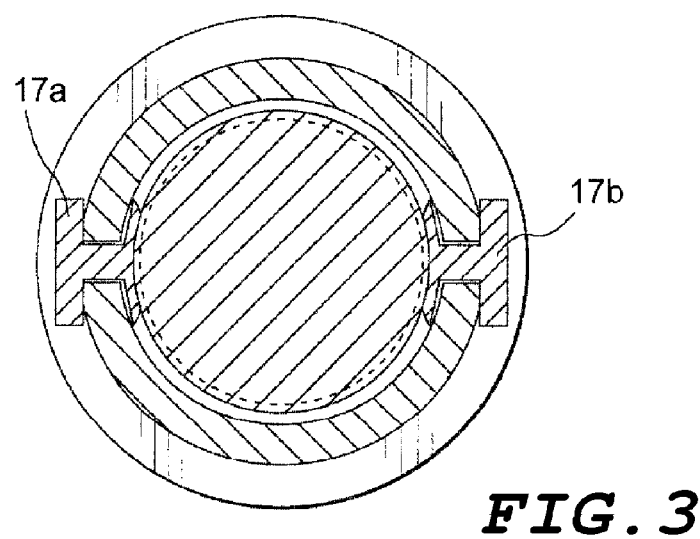
FIG. 3 is a partial cutaway plan view taken from FIG. 1 as shown in the figure.

Referring now to FIG. 3, the engagement portion of the inserts 17a and 17b is deformable so that by the force of the screw it will conform to the cylindrical shape of the screw/bushing interface. This figure best illustrates the capture of the H profile inserts 17a and 17b by the slot edges of the bushing sidewall. The slots also function to define opposing sidewall halves which by the resilient nature of the bushing material can provide an inwardly directed frictional gripping force against the screw. And thus by these mechanical relations with suitable dimensions of the elements having been selected a prevailing torque is applied to screw 15 by both the insert and the bushing while ensuring reliable electrical contact between the screw and the bushing.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A screw locking insert, comprising:
    a substantially cylindrical bushing having an internally threaded bore;
    a longitudinally extending first slot through a sidewall of said bushing, said slot extending through a top end of the bushing; and
    a first pre-formed H-profile insert lying partly within said slot, said insert comprised of an engagement portion lying within said bore and a base portion lying against an outside surface of said sidewall, such that said insert is longitudinally insertable into said slot through the top end of the bushing.

2. The device of claim 1 further including a second longitudinally extending slot through said sidewall opposite said first slot.

3. The device of claim 2 wherein said engagement portion of the insert includes surfaces which are tapered to a central protuberant longitudinal spine.

4. The device of claim 2 having a second insert, wherein said first and second inserts are deformable by a screw threaded into said bore such that said engagement portion will thereby conform to the cylindrical shape of a screw/bushing interface.

5. The device of claim 2 further including a second insert substantially identical to said first insert, said second insert lying partly within said second slot.

6. The device of claim 1 wherein said insert is composed of nylon.

7. A screw locking insert, comprising:
    a substantially cylindrical bushing having an internally threaded bore;
    a longitudinally extending first slot through a sidewall of said bushing and a second longitudinally extending slot through said sidewall opposite said first slot;
    a first H-profile insert lying partly within said slot, said insert comprised of an engagement portion lying within said bore and a base portion lying against an outside surface of said sidewall;
    wherein said engagement portion of the insert includes surfaces which are tapered to a central protuberant longitudinal spine; and,
    wherein said slots define opposing sidewall halves which provide a resilient inwardly directed gripping force directly against the screw.

8. The device of claim 7 wherein metal-to-metal electrical contact is provided between said bushing and said screw.

9. The device of claim 8 wherein said inserts are secured within said slots by force fit.

10. The device of claim 9 wherein recesses of the inserts capture edges of the sidewall inside and out.

* * * * *